(12) United States Patent
Haarh et al.

(10) Patent No.: US 7,832,987 B2
(45) Date of Patent: Nov. 16, 2010

(54) METHODS OF HANDLING A WIND TURBINE BLADE AND SYSTEM THEREFOR

(75) Inventors: Arne Haarh, Ringkøbing (DK); Gunnar Kamp Storgaard Pedersen, Skjern (DK); Flemming Andersen, Vildbjerg (DK)

(73) Assignee: Vestas Wind Systems A/S (DK)

( * ) Notice: Subject to any disclaimer, the term of this patent is extended or adjusted under 35 U.S.C. 154(b) by 861 days.

(21) Appl. No.: 10/587,619

(22) PCT Filed: Jan. 26, 2004

(86) PCT No.: PCT/DK2004/000055

§ 371 (c)(1),
(2), (4) Date: Apr. 11, 2007

(87) PCT Pub. No.: WO2005/071261

PCT Pub. Date: Aug. 4, 2005

(65) Prior Publication Data

US 2007/0258823 A1    Nov. 8, 2007

(51) Int. Cl.
*B65D 85/68* (2006.01)
*F03D 11/00* (2006.01)

(52) U.S. Cl. ............... 416/146 R; 416/248; 416/DIG. 6
(58) Field of Classification Search ............. 416/146 R, 416/248, DIG. 6
See application file for complete search history.

(56) References Cited

U.S. PATENT DOCUMENTS 6,371,730 B1 * 4/2002 Wobben ................. 416/244 R
2003/0116262 A1 * 6/2003 Stiesdal et al. .............. 156/245
2003/0175089 A1 * 9/2003 Almind .......................... 410/2
2004/0028528 A1 * 2/2004 Flemming ............... 416/146 R

FOREIGN PATENT DOCUMENTS

| DE | 102 00 401 | 7/2003 |
| DE | 102 25 025 | 12/2003 |
| DE | 103 05 543 | 8/2004 |
| WO | WO 02/083523 | 10/2002 |
| WO | WO 03057528 A1 * | 7/2003 |
| WO | WO 03/100249 | 12/2003 |
| WO | WO 03104645 A1 * | 12/2003 |

OTHER PUBLICATIONS

International Search Report; PCT/DK2004/000055; Oct. 28, 2004 (all references in search report listed above).

* cited by examiner

*Primary Examiner*—Edward Look
*Assistant Examiner*—Jesse Prager
(74) *Attorney, Agent, or Firm*—St. Onge Steward Johnston & Reens LLC

(57) ABSTRACT

A method of handling a wind turbine blade during storage, transport or mounting of the blade is presented. The method comprises the steps of: establishing at least one mounting hole penetrating the surface of the blade, mounting one or more handling means including mounting means in said at least one hole, and handling the wind turbine by at least said handling means on the wind turbine blade. A handling system and handling means for handling a wind turbine blade as well as a wind turbine blade and use hereof are also disclosed.

31 Claims, 10 Drawing Sheets

METHODS OF HANDLING A WIND TURBINE BLADE AND SYSTEM THEREFOR

BACKGROUND OF THE INVENTION

Figure 1:
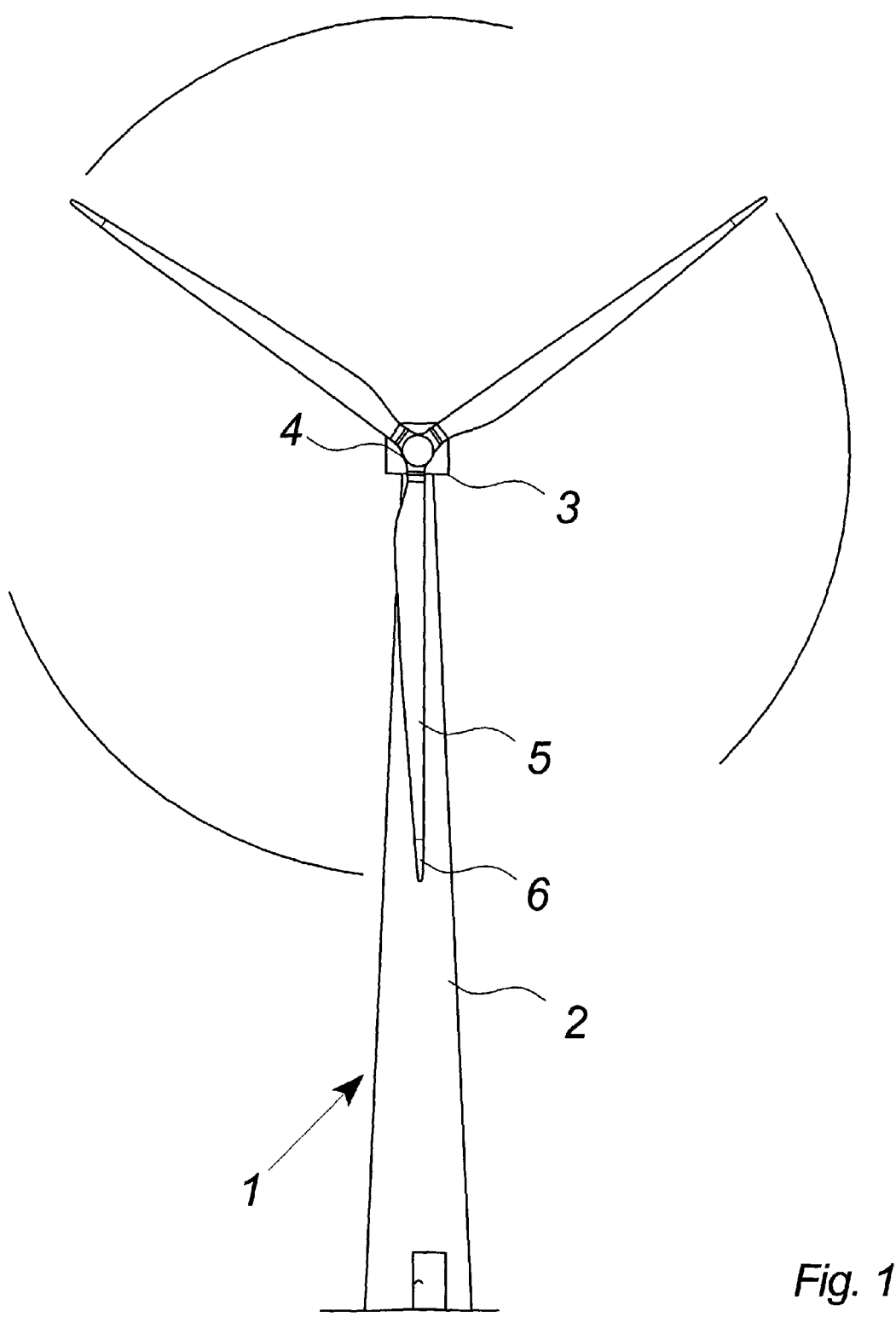

The invention relates to methods of handling and manufacturing a wind turbine blade, handling system, wind turbine blade, handling means and use hereof.

DESCRIPTION OF THE RELATED ART

The wind turbine blade is a very important component in a modern wind turbine and is highly important in defining the energy production and the lifespan of the wind turbine. The transport of the blades from the place of production to the place of erecting the wind turbine is thus a matter that requires a lot of consideration in relation to handling the blade safely during the transport.

The wind turbine blade comprises a smooth, polished and quite delicate surface that slopes from the root of the wind turbine blade toward the tip.

Previously, wind turbine blades have been handled by different handling systems such as straps tighten around the blade surface or adapted form parts forced against the blade surface. However, the well-known handling systems have all been less advantageous as they may either slide of or damage the wind turbine blade e.g. by creating deformations in the blade surface. They are especially less advantageous during unsteady transports such as sea or road transport in which the wind turbine blades are not surveyed in long time periods.

Generally, the handling systems must define the rigid structure in which the long, heavy and very flexible blade is incorporated. The size of the well-known handling systems thus becomes quite significant and complex in order to get the firmer grip on the wind turbine blades while still protecting the wind turbine blades and especially the surface.

With the long distance transports, the size, weight and price of the handling systems also become a significant problem as they have to be returned to the manufacturing plant of the wind turbine blades. Thus, the transport operating costs in erecting wind turbines include the expenses of returning large sized but empty handling systems e.g. in trucks or ships. Often the handling systems exceed the wind turbine blades in size and weight.

BRIEF DESCRIPTION IF THE INVENTION

The invention establishes methods and means for handling wind turbine blades without the above-mentioned disadvantages.

Especially, to the invention establishes methods and apparatuses for handling wind turbine blades which are less complicated in construction features, size and use. Further to the invention establishes wind turbine blades which are suitable for the handling methods and apparatuses.

The invention relates to a method of handling a wind turbine blade at least during storage, transport or mounting of the blade, said method comprising the steps of:
establishing at least one mounting hole penetrating the surface of the blade,
mounting one or more handling means including mounting means in said at least one hole, and
handling the wind turbine blade by at least said handling means on the wind turbine blade.

By the mounting means penetrating the surface of the blade, a fixed connection between the handling system and the blade is achieved without the above-mentioned disadvantages. Further, the connection is less complicated in use as it involves fewer, smaller and simpler construction features.

The creation and use of one or more holes in the surface of the wind turbine blade in connection with the handling of the blade go against teaching within the technical area.

In an aspect of the invention, said at least one mounting hole is established by a drilling process. By drilling the holes it is possible to establish holes which have clear definitions e.g. perfectly circular holes in the desired position. The clear definitions of the holes will especially be advantageous in connection with the subsequent closing of the holes in which the quality of the closing will affect the strength of the blade in the region.

In a further aspect of the invention, said at least one mounting hole is marked with visual signs indicating the location of the hole e.g. visual lines or circles on the surface of the blade. Hereby, may the mounting holes easily be found and used e.g. in transportation. Further, the indication signs may be used to locate the holes after they have been closed.

In another aspect of the invention, said mounting includes entering said mounting means through the blade. Hereby, it is possible to establish a safe hold on the blade by using handling means on opposite side of the blade which is connected through the blade by the mounting means.

However, the mounting means may in a simple embodiment of the invention penetrate the surface without going through e.g. by establishing a hold to the shell of the blade only with a number of screws.

In a further aspect of the invention, said one or more handling means are forced against the surface of the blade by said mounting means. By the handling means being forced against the surface of the blade, it is ensured that the blade is held and supported by the handling means.

In an even further aspect of the invention, said handling means are connected to handling rods, plates or walls. By the flexibility in the connection between the handling means and further structure such as the wall of a transport container, it is achieved that the transport, loading and handling in generally of the blade is easier and more advantageous than normal.

In an aspect of the invention, the connection to said handling rods, plates or walls is established by use of bolts, welding means or the like. Hereby, it is achieved that the connection may easily be established with use of only a few necessary tools. The connection or amendment of the connection can thus be performed anywhere necessary e.g. in areas with less possibility of energy supply such as on the road or at sea.

In another aspect of the invention, the blade is handled at least by the suspension points established by said handling means. By the non-moveable suspension points it is easier to control and predict the movement of the wind turbine blade e.g. during transport. Further, it is easier to protect the blade from damage as movement of the blade is avoided and damage thus primarily may come from outside objects hitting the surface of the blade.

The invention also relates to a method of manufacturing a wind turbine blade to be handled, said method comprising the steps of:
manufacturing at least a first and second shell of a wind turbine blade,
reinforcing at least one hole area of the inner surface of at least one of said shells by applying further layers of material, and
establishing at least one hole penetrating the surface at said at least one hole area.

The invention also relates to a handling system for handling a wind turbine blade at least during storage, transport or mounting of the blade, said system comprising at least one mounting hole penetrating the surface of the blade,
one or more handling means to be positioned on the surface of the wind turbine blade and mounting means to be mounted in said at least one hole.

In an aspect of the invention, said handling means are connected to a handling structure such as handling rods, handling plates and/or handling walls e.g. of a transport container.

In another aspect of the invention, said handling means comprise a surface substantially corresponding in shape to the section of the wind turbine blade that it covers. Hereby is ensured that the handling means are positioned correctly and being positioned correctly they will suit the surface perfectly and thus not damage it.

In a further aspect of the invention, said handling means are made in metal such as steel plate, in glass fiber reinforced plastic materials alone or glass fiber reinforced plastic materials reinforced with carbon fiber or aramid. By using the mentioned materials it is possible to establish a heavy-duty and strong connection point from the blade toward the rest of the handling means.

In an even further aspect of the invention, said system comprises two handling means positioned on the opposite sides of the wind turbine blade. Hereby it is possible to hold the wind turbine blade in a sort of vice with the handling means as vice jaws.

Due to the surface penetration of the blade by the mounting means, the handling means is arranged without the risk of sliding off.

In a further aspect of the invention, said two handling means are connected by the mounting means. By the connection of the handling means with the mounting means it is possible adjust the position and angling of the handling means e.g. relation to the rest of the handling system.

In another further aspect of the invention, said mounting means is one or more bolts with corresponding nuts. The bolts and nuts make it easy to adjust the position and angle of the handling means by loosen and tighten the nuts, respectively, e.g. in restricted or rural places.

In a further aspect of the invention, said mounting means goes through the wind turbine blade next to the beam or any other strengthening structure in the blade. By positioning the handling means in proximity with the strengthening structure of the blade it is possible to enhance the strength of the blade grip without damaging the blade.

In a further aspect of the invention, two of said mounting means go through the blade on opposite side of said beam or any other strengthening structure in the blade. Hereby it is possible to transfer the forces from each of the handling means to the beam in an advantageous and balanced manner.

In a further aspect of the invention, one or more of the surfaces of said handling means comprise a high friction material. The layer of high friction material enhances the connection between the handling means and the wind turbine blade, especially in a longitudinal direction of the blade. Further, the layer protects the surface of the wind turbine blade against damage from the handling system during mounting and use.

The layer may be attached to the surface of the handling means e.g. by using adhesive material. However, the layer may also be a separate sheet which is positioned between the wind turbine blade and the handling means before the mounting means are tightened.

The high friction material may be made in a number of materials such as rubber or a composition of Kevlar/Graphite.

In a further aspect of the invention, said blade comprises at least one hole area with one or more reinforcement layers on the inner surface of the blade. Hereby it is ensured that the hole area is as strong or stronger than the rest of the blade and thus may sustain the handling forces without sustaining any damage. Further, the hole area is at least as strong as the rest of the blade during normal use after the handling process has ended e.g. during rotation in connection with power production of the wind turbine.

In a further aspect of the invention, said reinforcement layers comprise glass fiber reinforced plastic materials alone or reinforced with carbon fiber or aramid. By using the common materials of the wind turbine blade the reinforcement is integrated as a natural part of the blade.

In further aspects of the invention, the length of said blade is at least 30 meters such as approximately 39, 44 or 49 meters or more and the weight of said blade is at least 6000 kilogram such as 6000 to 7500 kilogram e.g. approximately 6400, 6800 or 7200 kilogram. Hereby it is possible to handle wind turbine blades of considerable length and weight in an easy and reliable manner without danger of damaging the blades. Further, it is possible to handle more blades e.g. in each transport container system due to the lesser size of the necessary handling means.

The invention even further relates to a wind turbine blade to be handled at least during storage, transport or mounting, said blade comprising at least one hole area with one or more reinforcement layers on the inner surface of the blade and at least one hole where said at least one hole penetrates the surface of the blade at the hole area.

In a further aspect of the invention, said reinforcement layers comprise glass fiber reinforced plastic materials alone or reinforced with carbon fiber or aramid. Hereby, an advantageous embodiment of the invention is achieved.

In a further aspect of the invention, the surface of said at least one hole area includes visual signs indicating the location of the at least one hole e.g. visual lines or circles. Hereby, an advantageous embodiment of the invention is achieved.

In a further aspect of the invention, one or more of said at least one hole is part of the lightning protection system of the blade e.g. lightning receptor holes. Hereby it is possible to reuse the holes in different time periods of the life of wind turbine blades and thus minimize the number of holes in the surface of the blades.

In further aspects of the invention, the length of said blade is at least 30 meters such as approximately 39, 44 or 49 meters or more and the weight of said blade is at least 6000 kilogram such as 6000 to 7500 kilogram e.g. approximately 6400, 6800 or 7200 kilogram. Hereby is an advantageous embodiment of the invention achieved.

The invention also relates to handling means for a wind turbine blade at least during storage, transport or mounting, said handling means comprising at least one surface substantially corresponding in shape to the section of the wind turbine blade that the handling means covers, and
one or more mounting holes for fastening means fastening said handling means to the surface of the wind turbine blade by using at least one hole in the wind turbine blade.

In a further aspect of the invention, said means are made in metal such as steel plate, in glass fiber reinforced plastic materials alone or glass fiber reinforced plastic materials reinforced with carbon fiber or aramid. Hereby, an advantageous embodiment of the invention is achieved.

In a further aspect of the invention, one or more of the surfaces comprise a high friction material. Hereby is achieved an advantageous embodiment of the invention.

FIGURES

Figure 2:
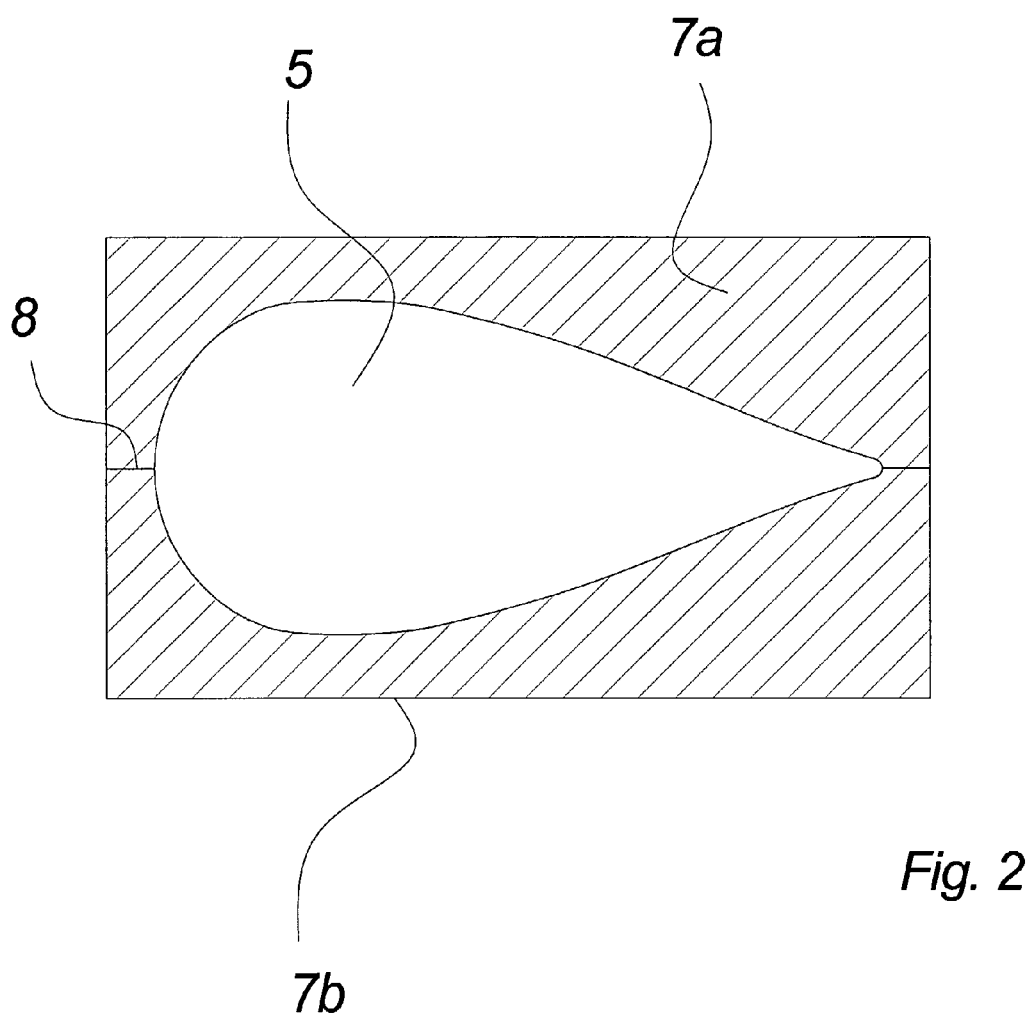
Figure 3:
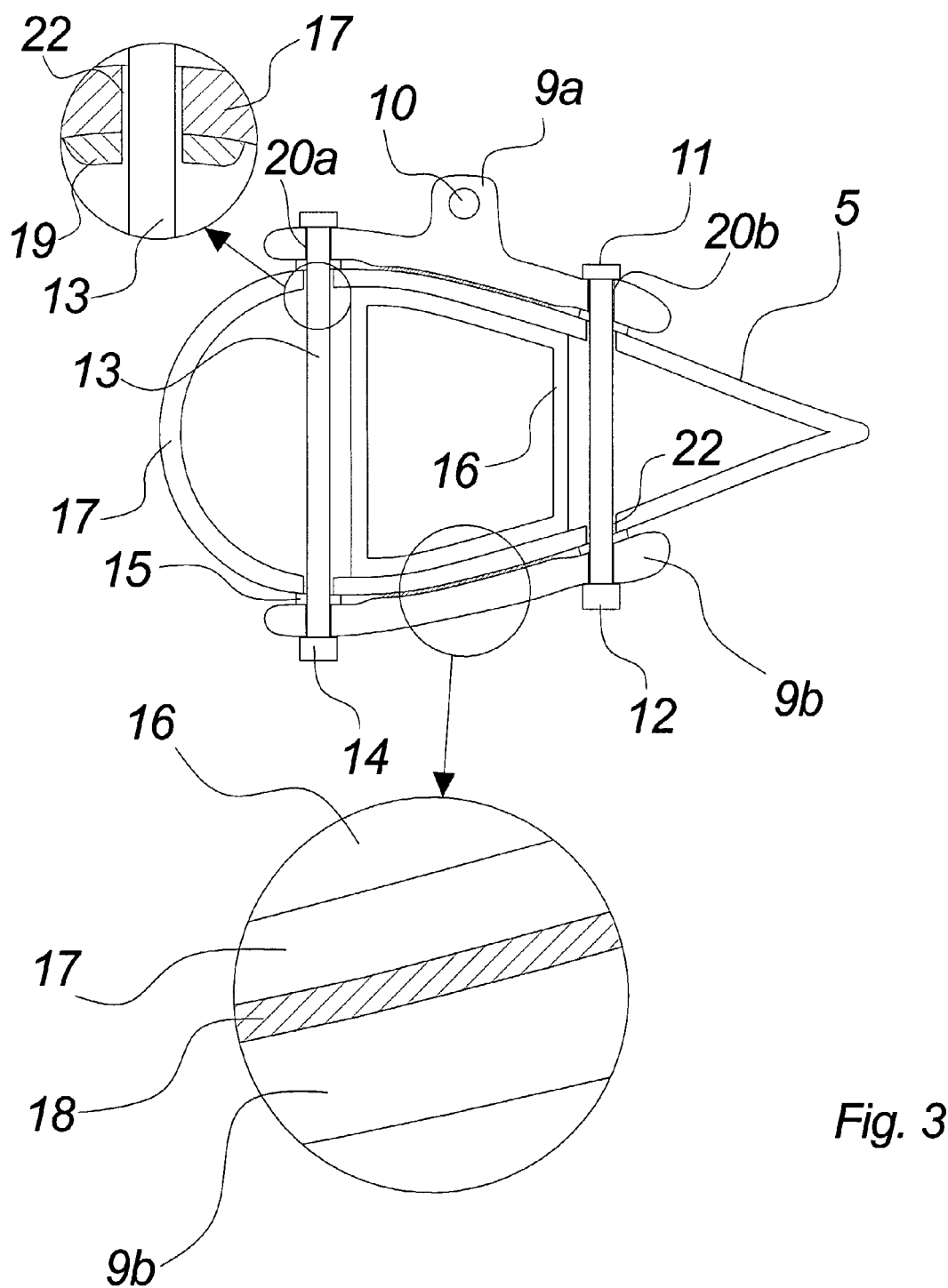
Figure 4:
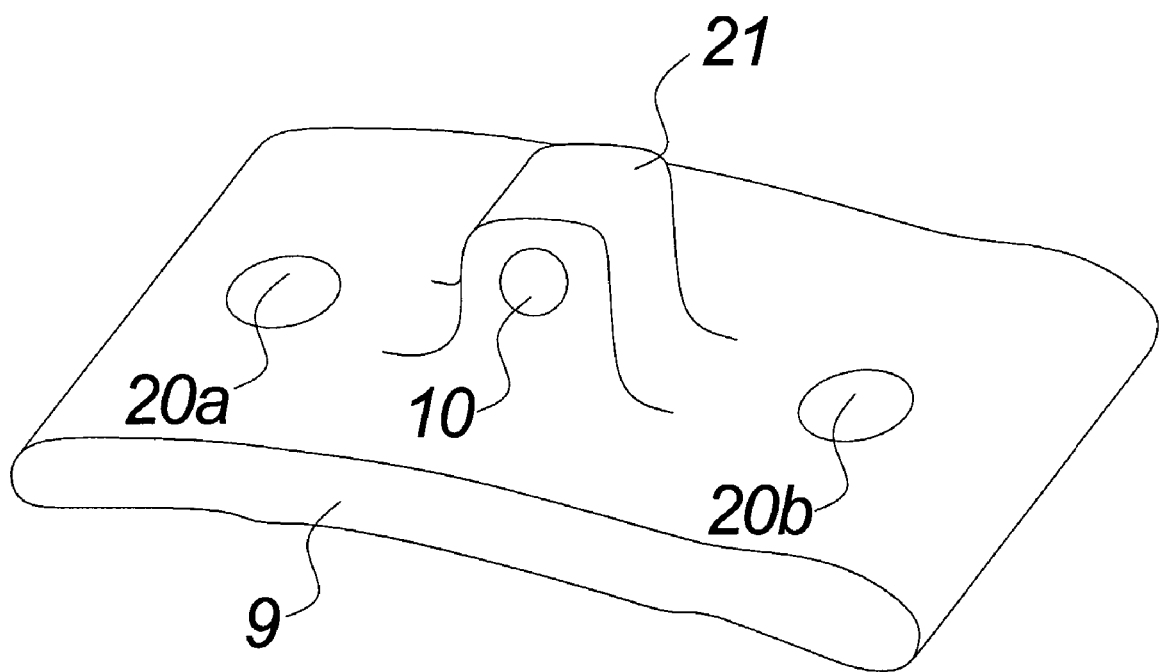
Figure 5A:
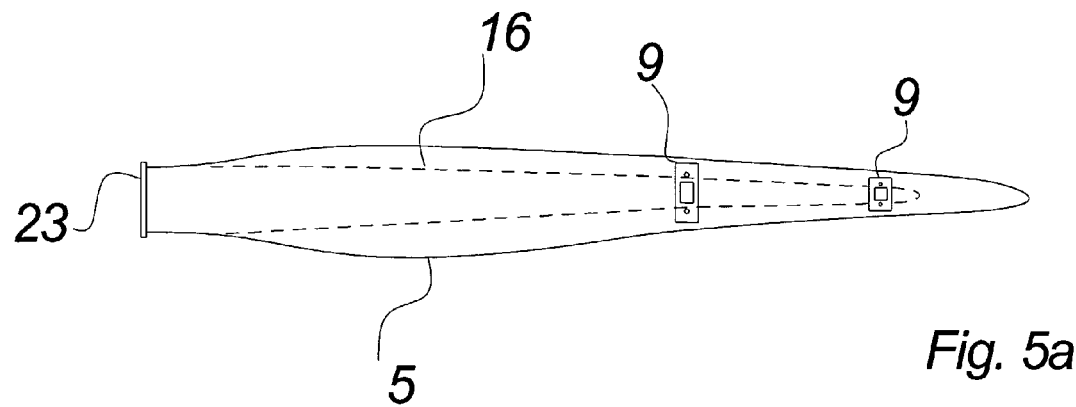
Figure 5B:
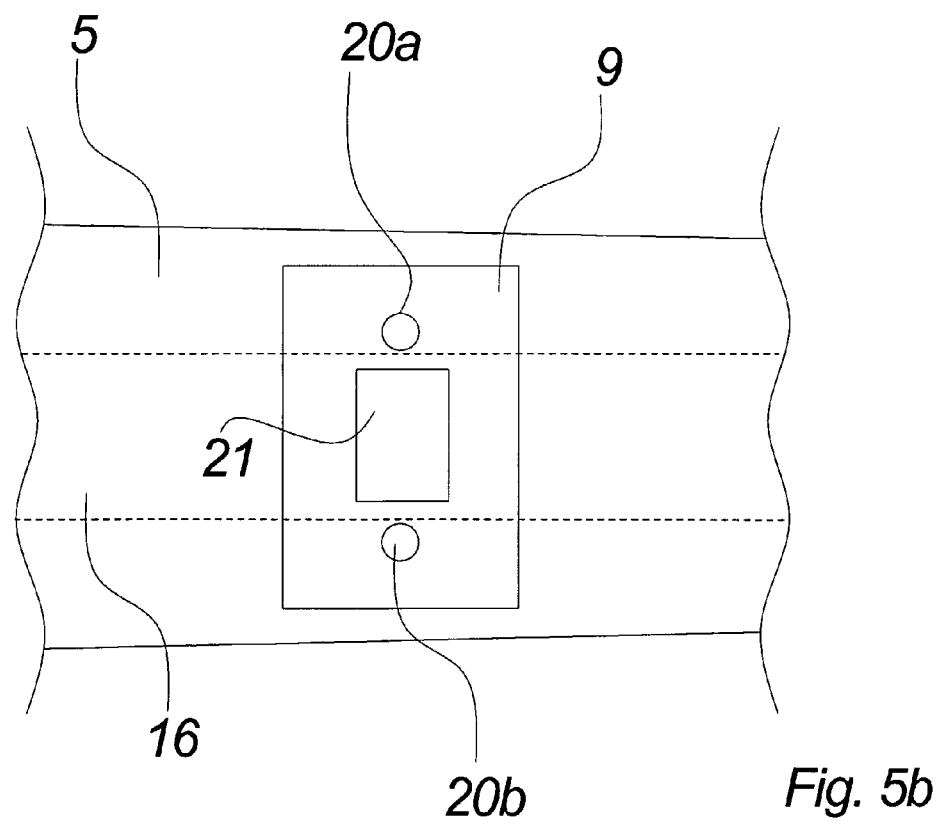
Figure 5C:
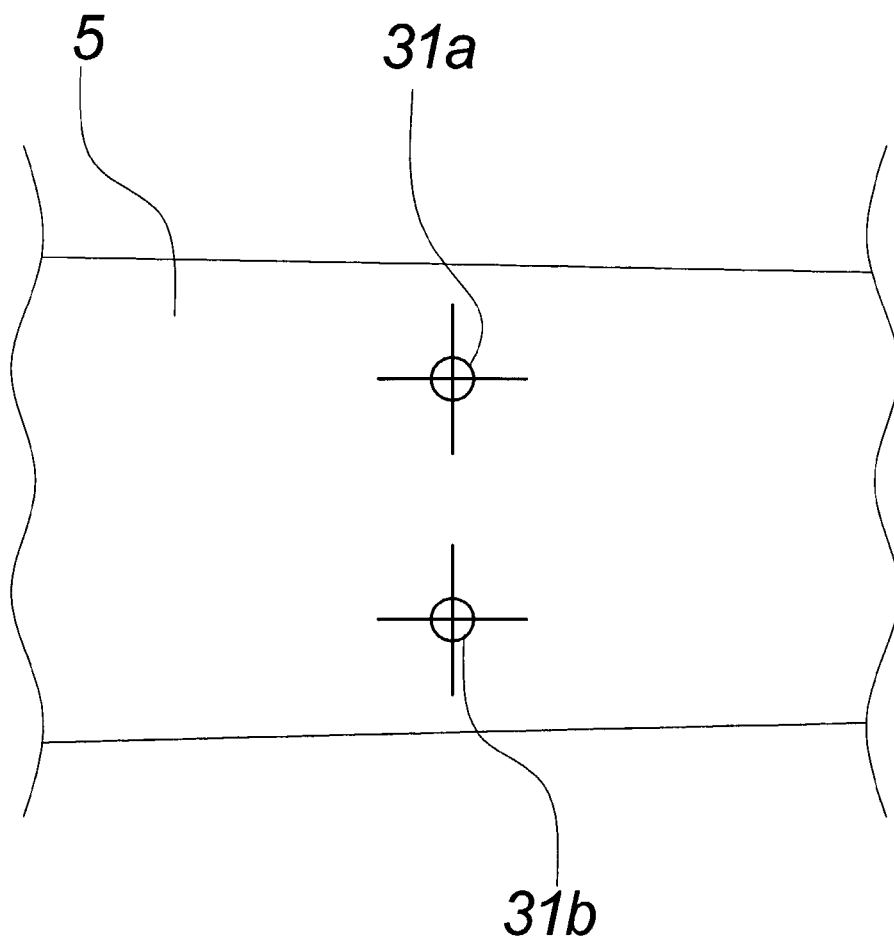
Figure 6:
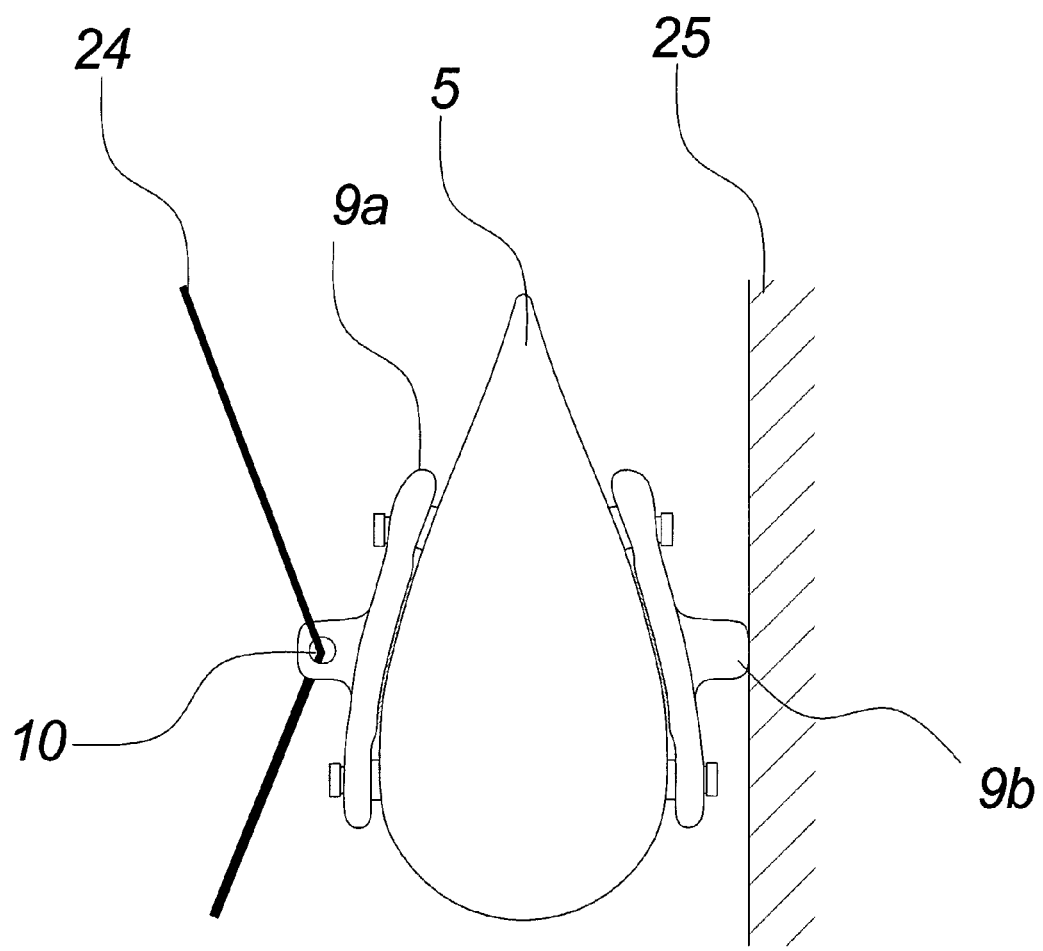

The invention will be described in the following with reference to the figures in which FIG. 1. illustrates a large modern wind turbine, FIG. 2 illustrates an example of well-known means for handling a wind turbine blade, FIG. 3 illustrates a cross sectional view of the handling system according to the invention mounted on a wind turbine blade and magnified sections of the same, FIG. 4 illustrates an embodiment of the handling means of the handling system in a perspective view, FIG. 5a illustrates a wind turbine blade with handling means mounted in different positions, FIG. 5b illustrates a section of the wind turbine blade with handling means mounted on the blade surface, FIG. 5c illustrates the section of the wind turbine blade with visual signs, FIGS. 6 illustrates the handling means on opposite side of the blade, the two bolts penetrating the blade and different methods of establishing connections to the handling means.

Figure 7:
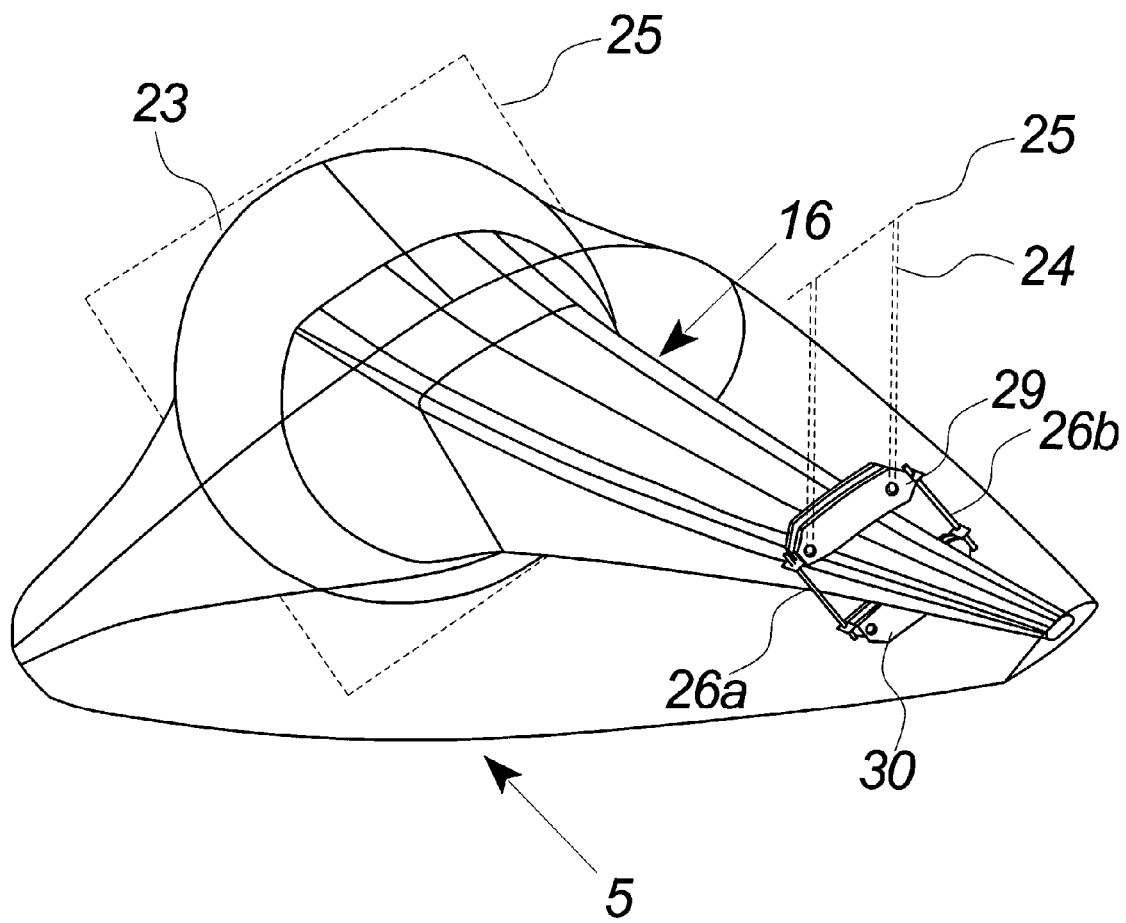
Figure 8A:
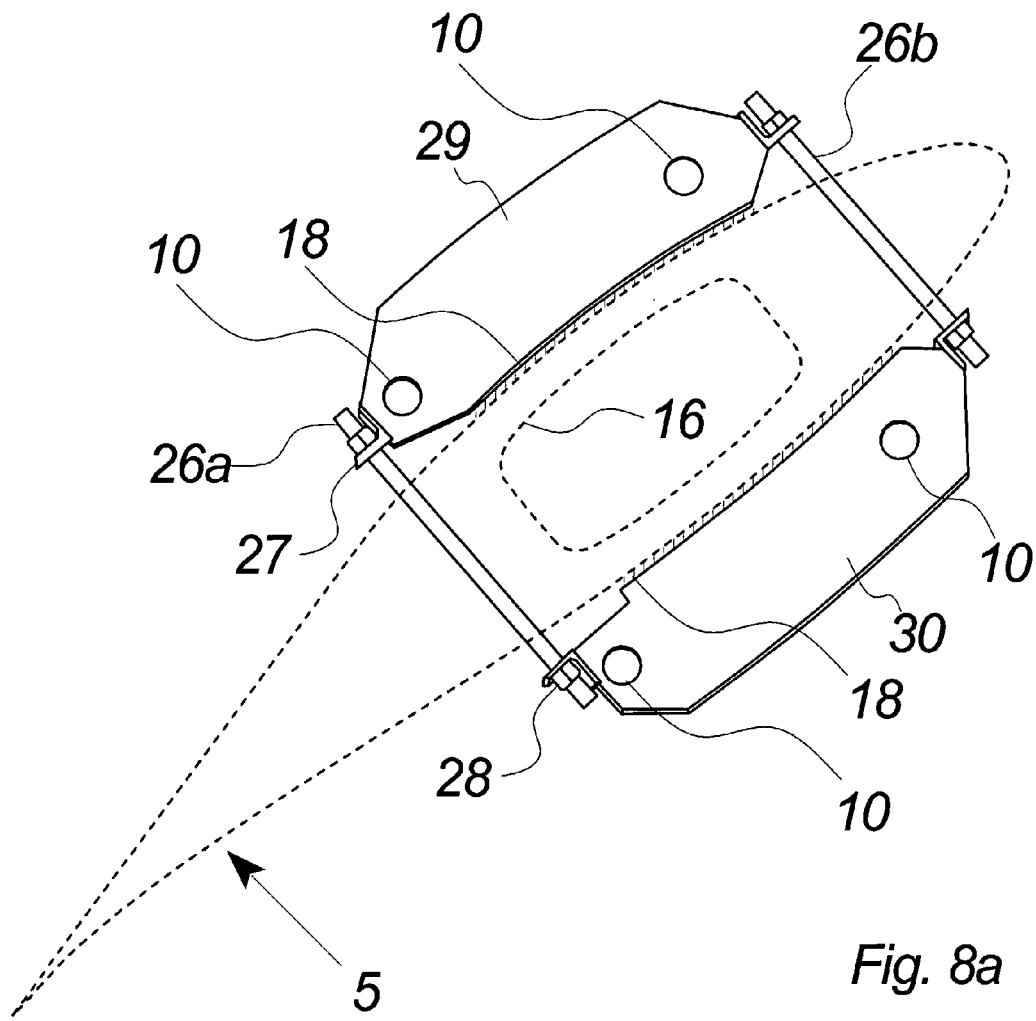
Figure 8B:
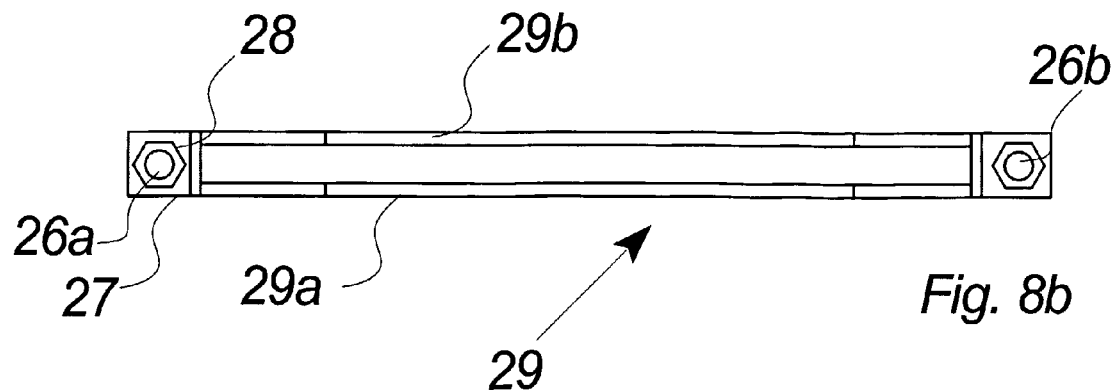
Figure 9:
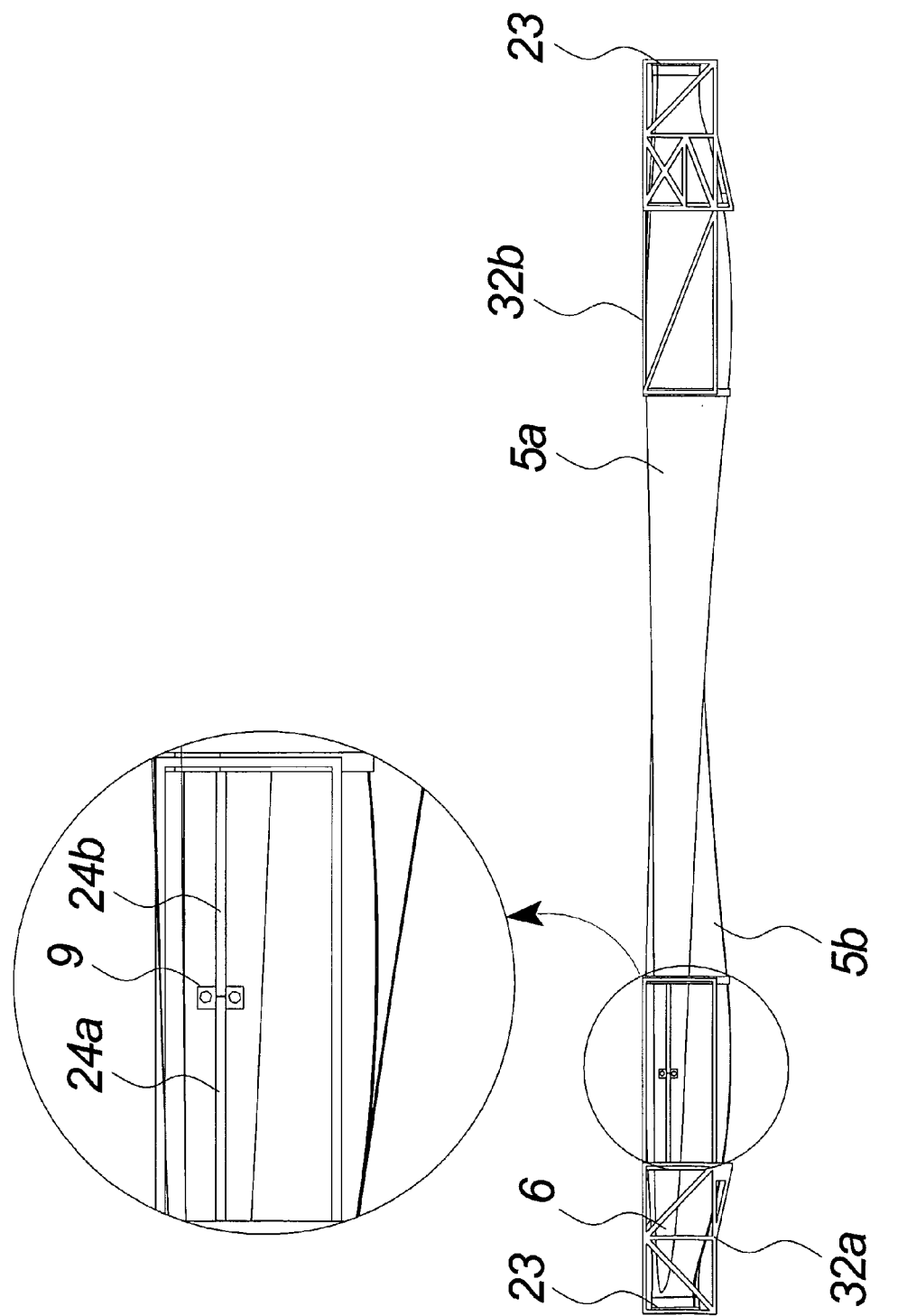

FIG. 7 illustrates another embodiment of the handling means according to the invention mounted on the surface of a partly transparent wind turbine blade, FIG. 8a illustrates in a detailed side view, the embodiment of the handling means in FIG. 7, FIG. 8b illustrates the handling means of FIG. 8a seen from above toward the surface of the wind turbine blade, and FIG. 9 illustrates an example of a use place for the handling system according to the invention.

DETAILED DESCRIPTION

FIG. 1 illustrates a modern wind turbine 1 with a tower 2 and a wind turbine nacelle 3 positioned on top of the tower. The blades 5 of the wind turbine rotor are connected to the nacelle through the low speed shaft which extends out of the nacelle front.

As illustrated in the figure, wind over a certain level will activate the rotor and allow it to rotate in a perpendicular direction to the wind. The rotation movement is converted to electric power which usually is supplied to the transmission grid as will be known by skilled persons within the area.

FIG. 2 illustrates an example of well-known means for handling a wind turbine blade with a form surrounding a section of the wind turbine blade 5.

The form comprises a first and second form part 7a, 7b which together have an inner surface corresponding to the shape of the blade section. The form parts are connected in connection areas 8 ahead and behind the leading and trailing edges of the wind turbine. The inner surface of the form parts either engages with the section of the wind turbine blade by being forced against the blade surface or alternatively simply handle the blade by surrounding it in a close manner.

FIG. 3 illustrates a cross sectional view of the handling system according to the invention mounted on a wind turbine blade. Further, the figure illustrates different parts of the handling system by using magnifications of the parts.

The wind turbine blade 5 is illustrated as a standard blade with an outer shell 17 made in glass fiber reinforced plastics (GRP). The interior of the blade comprises a beam 16 or a similar structure in order to strengthening the rigidity of the blade.

The handling system comprises two handling means 9a, 9b positioned on opposite side of the wind turbine blade 5. The handling means 9a, 9b are illustrated as two brackets in which each bracket has a surface that substantially follows the shape of the blade in question. The end sections of the brackets are slightly elevated above the surface which establishes spaces for distance pieces 15 between the sections and the surface of the wind turbine blade. The distance pieces are in a material protecting the blade against damage from the handling system. Further, the distance pieces ensure that water may not enter the area protected by the pieces e.g. the interior of the blade.

The handling means comprises a number of holes in which two sets of mounting holes 20a, 20b are intended for mounting means such as two bolts 11, 13 and corresponding two nuts 12, 14. Each of the bolts goes through the first handling means through the wind turbine blade and finally through the second handling means before being secured with one of the nuts. The bolts go through the wind turbine blade by holes 22 penetrating the shell surface of the blade. The mounting holes 20a, 20b are spaced apart in such a distance that the bolts go on opposite side of the beam. If the beam has a honeycomb structure or a similar structure the bolts will not meet the structure but enclose at least part of it.

Each of the handling means is preferably made as a bracket (as mentioned before) with a plate formed in such a way that it substantially comprises the same shape as the section of the blade surface that it covers. However, in order to create connections to the rest of the handling system the handling means may also comprise a flange e.g. with a fastening hole 10.

The upper magnification illustrates a part around one of the holes in the shell of the wind turbine blade. The shell around the hole is preferably reinforced with one or more extra layers of GRP material alone or together with carbon fibre or aramid (Kevlar) material. The extra layers may also be other materials such as a metal plate e.g. thin steel plate which is glued to the inner surface of the blade.

The lower magnification illustrates a central part of one handling means and the corresponding part of the wind turbine blade. In between the handling means 9b and the shell 17 of the blade, a surface layer 18 attached to the handling means is illustrated which engages with the blade surface. The surface layer is preferably a material with a high friction coefficient such as a layer of rubber.

FIG. 4 illustrates an embodiment of the handling means 9 of the handling system in a perspective view.

The figure illustrates how the embodiment of the handling means is constructed with a four-sided plate. The underside of the plate is shaped after and faces the surface of the wind turbine blade. On the top side a flange 21 is positioned with a hole 10 going through the flange. Further, the top side is illustrated with two holes 20a, 20b penetrating the handling means 9 in which the holes are positioned in the opposite ends of the handling means.

The number of holes may be altered e.g. a larger number of mounting holes in which different holes may be used in different blade applications or positions (such as explained in connection with FIG. 5a).

Further, the number of holes used at one position may also be altered e.g. a larger number of mounting holes such as a hole at each of the corners in the handling means.

In a further embodiment of the invention the opposite handling means may be connected by only one bolt in which the surface shape of the handling means establishing the further grip of the wind turbine blade. Further, the one bolt may be positioned beneath the beam in such a manner that the beam rests on the bolt and the handling of the blade e.g. is established by rigid connections to the handling means above the bolt. The connections and the bolt ensure that the handling means are kept in place against the opposite surfaces of the blade.

However, the shape of the relevant blade section should, substantially or partly, be reflected in the shape of the handling means regardless the number of holes/bolts in order to handle the blade safely.

FIG. 5a illustrates a wind turbine blade 5 such as a standard 39, 44 or 49 meters Vestas wind turbine blade with a weight between 6000 and 7500 kilogram e.g. approximately 6400 (39 meters), 6800 (44 meters) or 7200 kilogram (49 meters). The wind turbine blade 5 is illustrated with handling means 9 mounted on the surface of the blade. The wind turbine blade 5 is illustrated with a flange 23 at the blade root and a number of handling means 9. Further, the blade is illustrated with a beam which declines in size from the root toward the blade tip.

The handling means 9 are positioned at different positions in the longitudinal direction of the blade. The length of the two handling means (perpendicular to the longitudinal direction of the blade) and especially the distance between the two holes are illustrated as being different for the different handling means. The distances are different in order to ensure that the mounting means do not meet the beam when penetrating the blade.

The handling means closest to the tip may e.g. be in a position of circa 37 meter from the root of a 44 meter wind turbine blade. The position ensures that the mounting means of the handling means can surround the final section of the beam. Further, the rigidity of the wind turbine at the position ensures that balancing and handling of the blade is possible with just two suspension points—at the root and the handling means.

FIG. 5b illustrates a section of the wind turbine blade with handling means 9 mounted on the surface of the blade. The figure illustrates more details of the handling means including the two mounting holes 20a, 20b positioned just around the beam 16.

FIG. 5c illustrates the section of the wind turbine blade 5 with visual signs 31a, 31b before the mounting of the handling means or after the removal of the means and the closing of the mounting holes.

The visual signs 31a, 31b are generally used to indicate the location of the mounting holes e.g. in order to establish the holes or to reopen them. The visual signs may be made shortly after leaving the blade forms e.g. in connection with the mounting holes being drilled.

Further, the visual signs may be made after the holes have been closed e.g. in connection with the mounting of the wind turbine blades on the wind turbine. If the blades later are to be taken down again e.g. at reparation or dismantle of the wind turbine, the mounting holes may easily be found and reopened due to the visual signs.

In an embodiment the visual signs are created with lines and/or circles established on the surface of the wind turbine blade at the position of each hole, opened or closed, or at the position in which each hole is to be drilled. The lines and/or circles naturally indicate the position of the hole e.g. by vertical and horizontal lines forming a cross at the center of the hole and/or a circle with the same center and diameter as the hole.

The visual signs may be painted directly on the surface of the wind turbine blade or be part of stickers glued on the surface at position of the holes.

FIG. 6 illustrates the handling means on opposite side of the blade as well as the two bolts penetrating the blade.

Further, the figure illustrates different methods of establishing connections to the handling means 9.

The upper bolt is shown with the surrounding blade removed and the figure thus shows the path of the bolt through the blade as well as the handling means on opposite sides of the blade. Further, it shows that the bolt has a threaded end which is screwed into a bolt nut. By tightening the bolt and nut the handling means may be forced against the surface of wind turbine blade.

The first handling means 9a is illustrated as a fastening flange with a fastening hole 10 and the second handling means 9b as a similar flange but without the hole. Also the handling means may be without the flange and then be a flat plate as illustrated in FIG. 3 e.g. combined with eyebolts as mounting means. The two handling means may be the same in shape or be a combination of the different handling means e.g. the ones illustrated or other forms such as two flanges holding the holding rods or plates between them.

The connection to the handling means may be established by use of fastening means such as bolts securing handling rods, plates or walls to the handling means. Further, the connection may be established by welding, gluing or in similar ways connecting the handling means e.g. to handling rods or walls.

FIG. 7 illustrates another embodiment of the handling means according to the invention. The handling means 29, 30 are mounted on the surface of a wind turbine blade in which the blade is shown partly transparent. Due to the illustrated transparency of the wind turbine blade in the figure it is possible to see the handling means 29, 30 on opposite side of the blade as well as the mounting means 26a, 26b on opposite side of the internal beam 16 of the blade.

The figure further illustrates an example of handling of the wind turbine blade 5. The wind turbine blade is suspended at opposite ends of the wind turbine blade in order to connect the blade to the transport means such as walls 25 of one or more transport containers, a truck with a trolley vehicle or a crane.

The first suspension point may be the root flange 23 of the wind turbine blade which during normal use connects the blade to the wind turbine hub 4. The flange is connected directly or indirectly to the wall 25 of the transport means.

The second suspension point is positioned in the other end of the wind turbine blade and includes the handling means 29, 30 mounted on opposite side of the blade. The handling means each comprise two holding holes 10 to establish connection e.g. to walls 25 of the transport means with holding rods 24.

The flange 23 and the handling means 29, 30 may establish the total connection of the wind turbine blade to the transport means and with the connection methods described above in relation to FIG. 6a.

The handling system including the suspension points and the transport means e.g. the container walls establish a rigid structure for the suspended wind turbine blade.

FIGS. 8a and 8b illustrate the embodiment of the handling means in FIG. 7 in more details.

FIG. 8a illustrates the handling means 29, 30 mounted on the wind turbine blade 5 in a view substantially corresponding with the direction of the beam structure 16. The lower edge of the handling means 29, 30 substantially follow the shape of the wind turbine blade. Further, beneath each of the handling means is positioned a layer of high friction material 18.

The mounting means 26a, 26b may be thread bars or bolts that force the handling means against each other by the use of flanges 27. Each flange comprises perpendicular walls in which the first wall is attached to one side of the handling means. The second wall comprises a hole for the mounting means to penetrate before a nut is screwed onto the mounting means. By tightening the nuts against the surface of the flange it is possible to force the handling means against the blade and each other.

The figure further illustrates the path of the mounting means 26a, 26b on opposite side of the beam structure 16 after penetrating the surface of the wind turbine blade 5.

The handling means 29, 30 each comprises two handling holes 10 which is illustrated as positioned in opposite end of the handling means and in proximity of the flanges 27.

FIG. 8b illustrates the embodiment seen from above toward the surface of the wind turbine blade.

Each handling means 29 comprises two parallel plates—first and second plate 29a, 29b of the handling means in which the plates are substantially perpendicular with the surface of the wind turbine blade after the mounting. The two flanges 27 are welded or in similar way connected to the ends of the plates and has holes for the thread bars 26a, 26b and corresponding nuts 28 to use as mounting means for the handling means.

The four-sided structure, which is created by the first and second plate 29a, 29b of the handling means and two flanges 27, may in an embodiment be more rigid set up by using further plates or rods e.g. from corner to corner in the structure.

The embodiments 9, 9a, 9b, 29, 29a, 29b, 30 of the handling means are preferably made in metal such as in steel plates. However, the handling means manufactured in GRP material alone or reinforced with carbon fibre or aramid (Kevlar) is another possibility.

Further, the handling means may be made in numerous ways with different shapes e.g. four-sided, round or any other regular or irregular shape that are appropriated for the application and the blade in question. Further, the size of the handling means may be altered e.g. the length in relation to the span of the blade beam. However, the shape of the relevant blade section should substantially be reflected in the shape of the handling means in order to handle the blade.

FIG. 9 illustrates an example of a use place for the handling system according to the invention.

The transport of wind turbine blades often takes place over long distances in which the blades may be transported by truck, train or ship. In order to protect the blades during the more or less rugged transport, the blades are commonly positioned in some form of standardized container system. Preferably, the wind turbine blades 5a, 5b are stacked in pairs in the containers and in reverse order in such a way that the root 23 of the first blade is next to the tip of the second blade and vice versa as illustrated in the figure. The figure illustrates the system with the container walls removed illustrative purpose leaving only the structures 32a, 32b of the container system around each root/tip area of the blades.

The figure further illustrates that the handling system according to the present invention may be used in handling the wind turbine blades inside the one or more containers by establishing secure suspension points on the wind turbine blade in addition to the flanges at the roots of the blades. The container walls are indirectly through the structures 32a, 32b of the container system connected to the handling means 9 e.g. by the holding rods 24a, 24b or other rigid connection means establishing a handling structure between the handling means and the container (or any other means which may handle the wind turbine blade). In another embodiment the holding rods 24a, 24b are connected directly to the walls of the containers.

The handling system and especially the handling means may also be used in other situations besides transport e.g. at storage of the blades before transport in which the handling system and means secure that the blades especially do not need to rest on the edges of the blades.

Further, the handling system may be used in connection with mounting of the wind turbine blades on the hub or the nacelle e.g. as a supplement to the existing lifting systems. The handling system ensures that the tip section of the blade can be controlled as preferred by the fixed position of the handling means on the blade. The handling means may be removed by a person after the mounting of the blades wherein a crane lifts the person up to the handling means. The person performs the dismantle of the handling means by using dismantle tools and subsequently closes the holes in the blades as will be explained further below.

Even further, the handling system may be used in connection with the manufacturing of the wind turbine blade: The blade is often manufactured as two shell parts and beam in which the beam is positioned on one shell part before the other shell part is lifted up and positioned above the first shell and the beam as a sort of lid. However, with handling means already mounted in each shell, e.g. by positioning a temporary bracket on the interior surface of the blade, it is possible to control the blade shell part during the lifting and positioning of the part. The temporary brackets may be removed just before the final position of the shell part or simply stay as reinforcements of the holes in the wind turbine blade.

The holes in the wind turbine blade are preferably made during the manufacturing process of the blade e.g. by integrating hole making means as a part of the blade shell forms or by drilling the holes subsequent to the manufacturing. The hole making may be at the same time as the reinforcement layers are arranged around the holes on the interior surface of the blade. However, the holes may also be made later in the process such as just before the transport starts in which the holes are drilled through the blade including the prearranged reinforcement layers.

The established holes are preferably circular and have diameters slightly bigger than the diameters of the bolts penetrating the blade e.g. slightly bigger than the diameter of an M12 or M16 bolt.

The holes may be closed before leaving the manufacturing plant e.g. by using a GRP rod or some kind of adhesive tape covering the holes in which the closing means are removed at the handling of the wind turbine blade.

Further, each of the holes may be subsequently after the handling be closed/filled with a GRP rod which may comprise a slightly declining shape e.g. a standard cone shape corresponding to the hole diameter. The cone may be covered in an adhesive material and entered into the hole. When the cone has reached its position in the hole, the cone top is cut of in level with the surface of the wind turbine blade and the area is fully closed with filler material and a layer of paint.

The holes may also form part of the lightning protection system of the wind turbine blade in which each hole is filled with a lightning receptor before the mounting of the blade on the wind turbine.

The invention has been exemplified above with reference to specific examples of the handling system as well as the wind turbine blade. However, it should be understood that the invention is not limited to the particular examples described above but may be altered e.g. in size, shape and choice of materials. Further, it should be understood that especially the handling means may be designed in a multitude of varieties within the scope of the invention as specified in the claims. Even further, it shall be emphasized that the handling system may be combined with a number of further blade handling and/or support systems such as slings and forms as the ones described in connection with FIG. 2.

The invention claimed is:

1. Method of handling a wind turbine blade at least during storage, transport or mounting of the blade, said method comprising the steps of:
   establishing at least two mounting holes penetrating a surface of the blade,
   mounting one or more handling means including at least two mounting means in said at least two holes, wherein said mounting means extend through the wind turbine blade on opposite sides of a strengthening structure inside the blade, and
   handling the wind turbine blade by at least said handling means on the wind turbine blade.

2. Method according to claim 1, wherein said at least two mounting holes are established by a drilling process.

3. Method according to claim 1, wherein said at least one mounting hole is marked with visual signs indicating a location of the hole wherein the visual signs comprise visual lines or circles on the surface of the blade.

4. Method according to claim 1, wherein said mounting includes entering said mounting means through the blade.

5. Method according to claim 1, wherein said handling means are connected to handling rods, plates or walls.

6. Method according to claim 5, wherein the connection to said handling rods, plates or walls is established by use of bolts, thread bars, or welding means.

7. Method according to claim 1, wherein the blade is handled at least by suspension points established by said handling means.

8. Method of manufacturing a wind turbine blade to be handled, said method comprising:
   manufacturing at least a first and second shell of a wind turbine blade;
   reinforcing at least one hole area of an inner surface of at least one of said shells by applying further layers of material; and
   establishing at least one mounting hole penetrating surface of the wind turbine blade at said at least one hole area.

9. Method according to claim 8, wherein said at least one mounting hole is established by a drilling process.

10. Method according to claim 8, wherein said at least one mounting hole is marked with visual signs indicating a location of the hole wherein the visual signs comprise visual lines or circles on the surface of the blade.

11. Handling system for handling a wind turbine blade at least during storage, transport or mounting of the blade, said system comprising:
    at least two mounting holes penetrating the surface of the blade,
    one or more handling means to be positioned on the surface of the wind turbine blade and including a surface substantially or partly corresponding in shape to the section of the wind turbine blade that it covers, and
    at least two mounting means to be mounted in said at least two holes,
    wherein said mounting means extend through the wind turbine blade on opposite sides of a strengthening structure inside the blade.

12. Handling system according to claim 11, where said handling means are connected to a handling structure comprising handling rods, handling plates and/or handling walls of a transport container.

13. Handling system according to claim 11, where said handling means are made in metal comprising a steel plate, in glass fiber reinforced plastic materials alone or glass fiber reinforced plastic materials reinforced with carbon fiber or aramid.

14. Handling system according to claim 11, where said system comprises two handling means positioned on opposite side of the wind turbine blade.

15. Handling system according to claim 14, where said two handling means directly or indirectly are connected by the mounting means.

16. Handling system according to claim 15, where two flanges are fastened to opposite ends of the handling means and establish connection points for the mounting means.

17. Handling system according to claim 11, where said mounting means is one or more bolts or thread bars with corresponding nuts.

18. Handling system according to claim 11, where said mounting means goes through the wind turbine blade next to a beam or any other strengthening structure in the blade.

19. Handling system according to claim 18, where two of said mounting means go through the blade on opposite side of said beam or any other strengthening structure in the blade.

20. Handling system according to claim 11, where one or more of the surfaces of said handling means comprise a high friction material.

21. Handling system according to claim 11, where said blade comprises at least one hole area with one or more reinforcement layers on an inner surface of the blade.

22. Handling system according to claim 21, where said reinforcement layers comprise glass fiber reinforced plastic materials alone or reinforced with carbon fiber or aramid.

23. Handling system according to claim 11, where a length of said blade is at least 30 meters.

24. Handling system according to claim 11, where a weight of said blade is at least 6000 kilogram.

25. Wind turbine blade to be handled at least during storage, transport or mounting, said blade comprising at least one hole area with one or more reinforcement layers on an inner surface of the blade and at least two holes where said at least two holes penetrate a surface of the blade at the hole area and on opposite sides of a strengthening structure inside the blade.

26. Wind turbine blade according to claim 25, where said reinforcement layers comprise glass fiber reinforced plastic materials alone or reinforced with carbon fiber or aramid.

27. Wind turbine blade according to claim 25, where the surface of said at least one hole area includes visual signs indicating a location of the at least one hole wherein the visual signs comprise visual lines or circles.

28. Wind turbine blade according to claim 25, where one or more of said at least two holes are part of the lightning protection system of the blade.

29. Wind turbine blade according to claim 25, where a length of said blade is at least 30 meters.

30. Wind turbine blade according to claim 25, where a weight of said blade is at least 6000 kilogram.

31. Method according to claim 1, wherein said mounting means extend through the wind turbine blade at positions that ensure that balancing and handling of the blade with just two suspension points, where a first point is at a root and a second is at the handling means.

* * * * *